(12) United States Patent
O'Coin

(10) Patent No.: US 11,391,383 B2
(45) Date of Patent: Jul. 19, 2022

(54) DRIVE KEY FOR ROTATING EQUIPMENT ACCOMMODATING CENTER LINE MISALIGNMENT WHILE MINIMIZING HYSTERESIS

(71) Applicant: Hamilton Sundstrand Corporation, Charlotte, NC (US)

(72) Inventor: James R. O'Coin, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 30 days.

(21) Appl. No.: 16/910,696

(22) Filed: Jun. 24, 2020

(65) Prior Publication Data
US 2021/0404566 A1 Dec. 30, 2021

(51) Int. Cl.
*F16K 11/08* (2006.01)
*F16K 11/087* (2006.01)
(Continued)

(52) U.S. Cl.
CPC ........ *F16K 11/0873* (2013.01); *F16K 5/0442* (2013.01); *F16D 3/10* (2013.01); *Y10T 137/6035* (2015.04)

(58) Field of Classification Search
CPC .............. F16K 11/087; F16K 11/0873; F16K 11/0876; F16K 11/056; F16K 11/0565; F16K 5/0442; F16K 5/0647; F16K 5/0652; F16K 11/16; F16K 5/00–227; F01L 7/00; F01L 7/10; F01L 2313/00; F16D 3/04; F16D 1/05; F16D 1/08; F16D 3/06; F16D 3/10; F15B 13/00; Y10T 137/87161; Y10T 137/6035; Y10T 137/0508

USPC ............ 137/625.41, 625.31, 625.32, 625.47, 137/625.46, 630.15, 630.21, 137/625.22–625.24, 625.18, 625.19, 137/601.16, 616.7, 315.17–315.21, 15.22, 137/595, 597; 403/359, 380, 354; 251/292, 291, 293, 128, 304–317.01, 352,
(Continued)

(56) References Cited

U.S. PATENT DOCUMENTS 3,324,958 A * 6/1967 Clark .................... E21B 19/086
175/84
3,450,157 A * 6/1969 Hewson .................. F16K 11/16
137/595
(Continued)

OTHER PUBLICATIONS

The Extended European Search Report for Application No. 21173276. 3-1104; Report dated Oct. 26, 2021; 9 pages.

*Primary Examiner* — Craig J Price
(74) *Attorney, Agent, or Firm* — Cantor Colburn LLP

(57) ABSTRACT

A rotary valve includes a first ball valve including a first stem extending from a first proximal stem end to a first distal stem end outward from the first ball valve. The first stem including a first slotted opening extending from the first distal stem end into the first stem. The rotary valve includes a second ball valve including a second stem extending from a second proximal stem end to a second distal stem end outward from the second ball valve. The second stem including a second slotted opening extending from the second distal stem end into the second stem. The second stem extends towards the first stem. The rotary valve includes a drive key of non-uniform thickness located within the first slotted opening and the second slotted opening. The drive key operably connects the first ball valve to the second ball valve.

16 Claims, 11 Drawing Sheets

(51) Int. Cl.
*F16K 5/04* (2006.01)
*F16D 3/10* (2006.01)

(58) Field of Classification Search
USPC .............. 251/187, 188, 192, 129.11, 129.13; 464/104
See application file for complete search history.

(56) References Cited

U.S. PATENT DOCUMENTS

| | | | | |
|---|---|---|---|---|
| 3,528,448 A * | 9/1970 | Urban | ................... | F16K 5/208 137/242 |
| 3,730,161 A * | 5/1973 | Deane | ................... | F01L 7/10 123/190.14 |
| 3,819,149 A * | 6/1974 | Kinder | ................... | F16K 27/067 251/309 |
| 3,900,401 A * | 8/1975 | Oliver | ................... | B01D 35/12 210/238 |
| 4,175,580 A * | 11/1979 | Kalbfleisch | ........... | F16K 5/0626 137/315.19 |
| 4,475,712 A * | 10/1984 | DeJager | ............... | F16K 5/0285 251/214 |
| 4,480,814 A | 11/1984 | Vinciguferra | | |
| 4,593,570 A * | 6/1986 | Niskin | ................... | G01N 1/12 403/383 |
| 4,887,567 A * | 12/1989 | Matsuura | ................... | F01L 7/00 123/190.14 |
| 5,127,628 A | 7/1992 | Kemp | | |
| 5,267,903 A | 12/1993 | Kuribayashi | | |
| 5,443,722 A | 8/1995 | Desai et al. | | |
| 6,197,195 B1 * | 3/2001 | Booth | ................... | B01D 29/35 210/340 |
| 6,886,508 B1 * | 5/2005 | Luffy | ................... | F01M 1/18 123/198 B |
| 7,306,010 B2 * | 12/2007 | Gruener, Sr. | ......... | F16K 5/0626 137/15.22 |
| 7,506,665 B2 * | 3/2009 | Gruener, Sr. | ......... | F16K 5/0626 137/15.22 |
| RE40,721 E * | 6/2009 | Desai | ................... | B01D 29/35 210/253 |
| 8,356,627 B2 * | 1/2013 | Hoshi | ................... | G01F 1/36 137/597 |
| 10,215,290 B2 * | 2/2019 | Wolf | ................... | F16K 5/045 |
| 11,002,368 B2 * | 5/2021 | Clement | ................... | F16K 5/08 |
| 2002/0145126 A1 * | 10/2002 | Lian | ................... | F16K 5/0642 251/315.14 |
| 2006/0196567 A1 * | 9/2006 | Gruener, Sr. | ............... | F16K 5/0626 137/797 |
| 2010/0018399 A1 * | 1/2010 | Barone | ............... | F16K 11/0876 96/122 |
| 2017/0328480 A1 * | 11/2017 | Rizzio | ................... | F16K 5/0657 |
| 2018/0080664 A1 * | 3/2018 | Arrus | ................... | F16K 5/0605 |
| 2018/0094733 A1 * | 4/2018 | Clement | ............. | F16K 37/0008 |

* cited by examiner

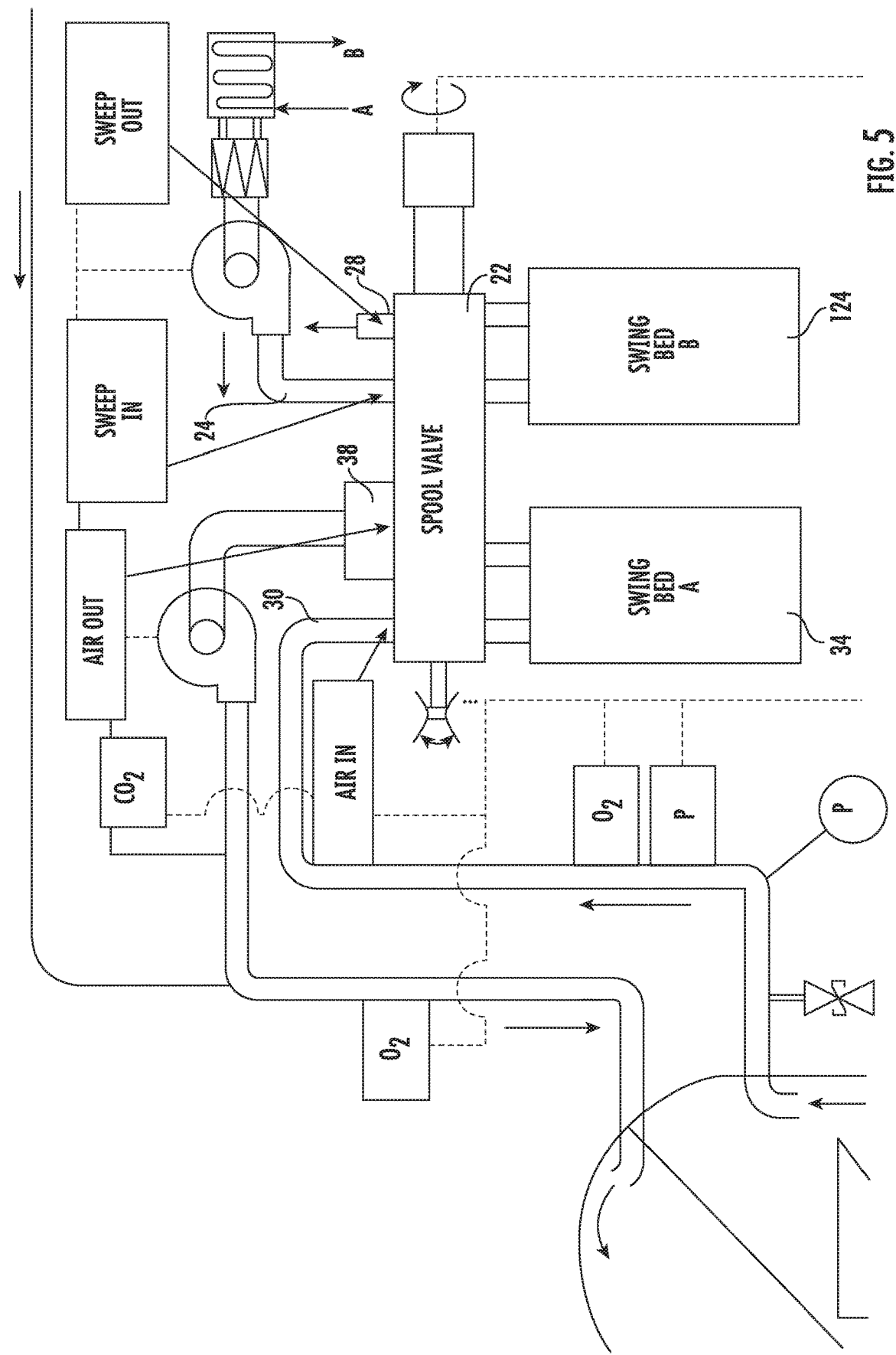

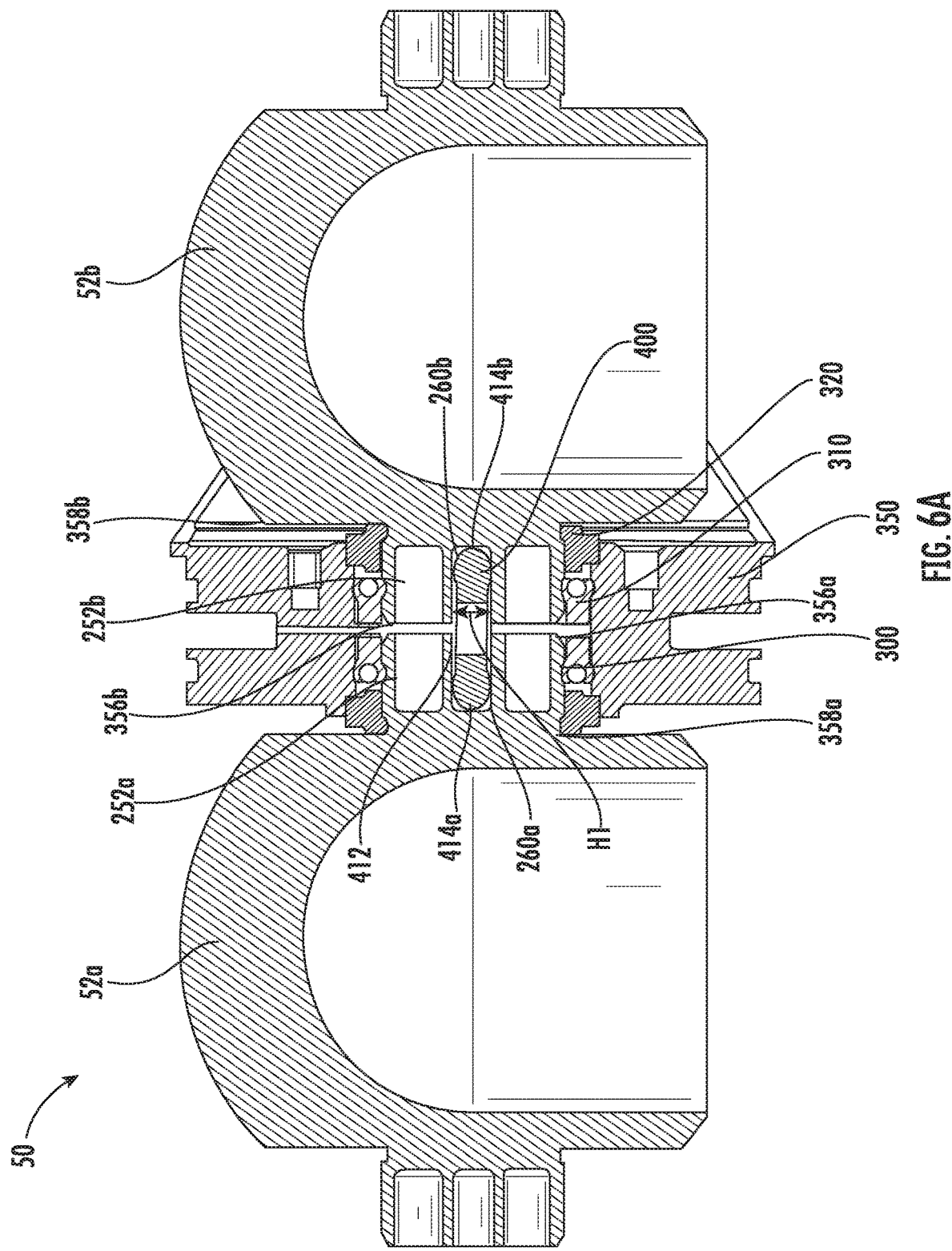

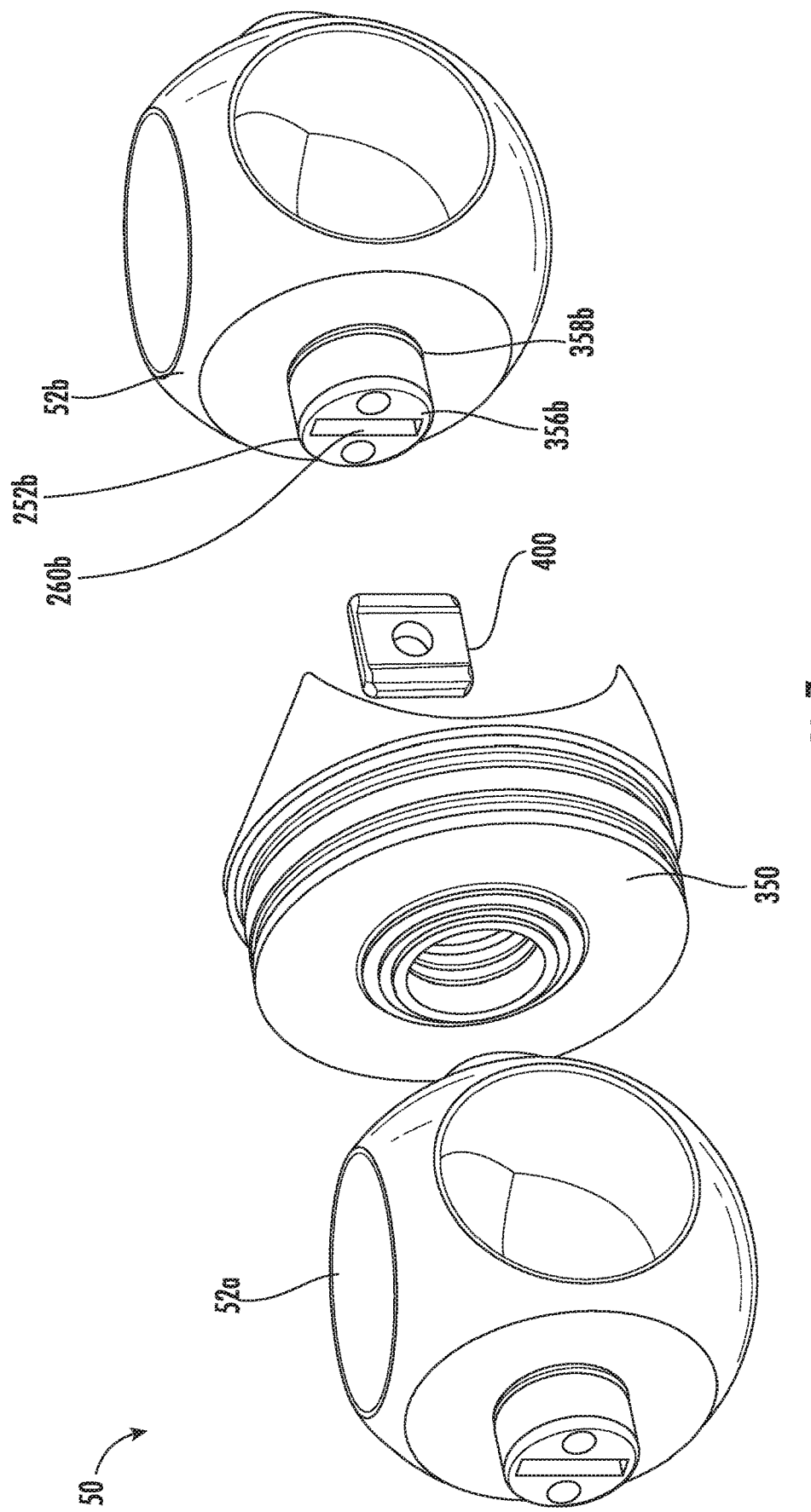

DRIVE KEY FOR ROTATING EQUIPMENT ACCOMMODATING CENTER LINE MISALIGNMENT WHILE MINIMIZING HYSTERESIS

BACKGROUND

The subject matter disclosed herein relates generally to the field of rotary valve system for routing gas flow in a twin bed treatment system, and specifically to a drive key for rotating equipment accommodating center line misalignment while minimizing hysteresis.

Systems provide breathable air through an adsorption process. Typically, at least two beds which include a sorbent material, such as sorbent beads, are operated in combination. A gas stream containing impurities, such as carbon dioxide in air, is passed through a first sorbent bed. The impurities, such as carbon dioxide are removed by the sorbent beads, and a cleaned air stream is passed downstream to a use. The use might be a space suit, a space station, a submarine, or any other habituated environment which does not have ready access to breathable air. The gas stream containing the impurities typically returns from this use.

At the same time as the first sorbent bed is removing impurities and providing clean air, a second sorbent bed is being desorbed. In a desorbed process a cleaning or sweep gas is passed through the second bed, and removes impurities. The sweep gas and the entrained impurities are passed to a treatment process, or vented into an atmosphere about the environment. While the term "sweep gas" may be utilized in this application, it should be understood that the sweep gas functionality may also be accomplished with the application of a vacuum to remove the impurities.

A valve system is required for these systems to alternately connect the beds in a continuous cycle. Often, separate valve members and valve actuators have been provided for each of the beds. Linear actuators have also been utilized.

BRIEF SUMMARY

According to one embodiment, a rotary valve is provided. The rotary valve includes a first ball valve including a first stem extending from a first proximal stem end to a first distal stem end outward from the first ball valve. The first stem including a first slotted opening extending from the first distal stem end into the first stem. The rotary valve includes a second ball valve including a second stem extending from a second proximal stem end to a second distal stem end outward from the second ball valve. The second stem including a second slotted opening extending from the second distal stem end into the second stem, wherein the second stem extends towards the first stem. The rotary valve includes a drive key located within the first slotted opening and the second slotted opening. The drive key extending from the first slotted opening of the first ball valve to the second slotted opening of the second ball valve to operably connect the first ball valve to the second ball valve. The drive key has a non-uniform thickness.

In addition to one or more of the features described above, or as an alternative, further embodiments may include that a first thickness proximate a middle of the drive key is less than a second thickness proximate a first outer end of the drive key and a second outer end of the drive key.

In addition to one or more of the features described above, or as an alternative, further embodiments may include that the drive key is a square prism.

In addition to one or more of the features described above, or as an alternative, further embodiments may include that the drive key includes a first square side surface and a second square side surface opposite the first square side surface.

In addition to one or more of the features described above, or as an alternative, further embodiments may include that the drive key includes: a first rectangular side surface extending from the first square side surface to the second square side surface and a second rectangular side surface extending from the first square side surface to the second square side surface. The second rectangular side surface being located at the first outer end of the drive key. The drive key also includes a third rectangular side surface located opposite the first rectangular side surface. The third rectangular side surface extending from the first square side surface to the second square side surface. The drive key also includes fourth rectangular side surface located opposite the second rectangular side surface, the fourth rectangular side surface extending from the first square side surface to the second square side surface. The fourth rectangular side surface is located at the second outer end of the drive key.

In addition to one or more of the features described above, or as an alternative, further embodiments may include that the drive key includes a first longitudinal bump located on the first square side surface, a second longitudinal bump located on the first square side surface, a third longitudinal bump located on the second square side surface, and a fourth longitudinal bump located on the second square side surface.

In addition to one or more of the features described above, or as an alternative, further embodiments may include that the third longitudinal bump is located opposite the first longitudinal bump and the fourth longitudinal bump is located opposite the second longitudinal bump. The second thickness of the drive key is measured between the third longitudinal bump and the first longitudinal bump. The second thickness of the drive key is measured between the fourth longitudinal bump and the second longitudinal bump.

In addition to one or more of the features described above, or as an alternative, further embodiments may include that the first longitudinal bump, the second longitudinal bump, the third longitudinal bump, and the fourth longitudinal bump extend continuously or intermittently between the first rectangular side surface and the third rectangular side surface.

In addition to one or more of the features described above, or as an alternative, further embodiments may include that the first distal end and the second distal end are separated by a gap having a gap distance. The first thickness spans across a first length of the drive key. The first length being greater than or equal to the gap distance.

According to another embodiment, a drive key for use in a rotary valve is provided. The drive key includes a first square side surface, a second square side surface opposite the first square side surface, a first rectangular side surface extending from the first square side surface to the second square side surface, a second rectangular side surface extending from the first square side surface to the second square side surface, and a third rectangular side surface located opposite the first rectangular side surface. The third rectangular side surface extending from the first square side surface to the second square side surface. The drive key also including a fourth rectangular side surface located opposite the second rectangular side surface. The fourth rectangular side surface extending from the first square side surface to the second square side surface. The drive key has a non-uniform thickness.

In addition to one or more of the features described above, or as an alternative, further embodiments may include that the drive key has a first thickness proximate a middle of the drive key is less than a second thickness proximate a first outer end of the drive key and a second outer end of the drive key. The second rectangular side surface is located at the first outer end of the drive key and the fourth rectangular side surface is located at the second outer end of the drive key.

In addition to one or more of the features described above, or as an alternative, further embodiments may include that the drive key includes: a first longitudinal bump located on the first square side surface, a second longitudinal bump located on the first square side surface, a third longitudinal bump located on the second square side surface, and a fourth longitudinal bump located on the second square side surface.

In addition to one or more of the features described above, or as an alternative, further embodiments may include that the third longitudinal bump is located opposite the first longitudinal bump and the fourth longitudinal bump is located opposite the second longitudinal bump. The second thickness of the drive key is measured between the third longitudinal bump and the first longitudinal bump. The second thickness of the drive key is measured between the fourth longitudinal bump and the second longitudinal bump.

According to another embodiment, a method of assembling a rotary valve is provided. The method including: obtaining a first ball valve including a first stem extending from a first proximal stem end to a first distal stem end outward from the first ball valve. The first stem including a first slotted opening extending from the first distal stem end into the first stem. The method also includes: obtaining a second ball valve including a second stem extending from a second proximal stem end to a second distal stem end outward from the second ball valve. The second stem including a second slotted opening extending from the second distal stem end into the second stem. The second stem extends towards the first stem. The method also includes inserting a drive key into the first slotted opening and the second slotted opening. The drive key extending from the first slotted opening of the first ball valve to the second slotted opening of the second ball valve to operably connect the first ball valve to the second ball valve. The drive key has a non-uniform thickness.

In addition to one or more of the features described above, or as an alternative, further embodiments may include that a first thickness proximate a middle of the drive key is less than a second thickness proximate a first outer end of the drive key and a second outer end of the drive key.

In addition to one or more of the features described above, or as an alternative, further embodiments may include that the drive key is a square prism.

In addition to one or more of the features described above, or as an alternative, further embodiments may include that the drive key includes a first square side surface and a second square side surface opposite the first square side surface.

In addition to one or more of the features described above, or as an alternative, further embodiments may include that the drive key includes: a first rectangular side surface extending from the first square side surface to the second square side surface and a second rectangular side surface extending from the first square side surface to the second square side surface. The second rectangular side surface being located at the first outer end of the drive key. The drive key includes a third rectangular side surface located opposite the first rectangular side surface. The third rectangular side surface extending from the first square side surface to the second square side surface. The drive key includes a fourth rectangular side surface located opposite the second rectangular side surface. The fourth rectangular side surface extending from the first square side surface to the second square side surface. The fourth rectangular side surface is located at the second outer end of the drive key.

In addition to one or more of the features described above, or as an alternative, further embodiments may include that the drive key includes a first longitudinal bump located on the first square side surface, a second longitudinal bump located on the first square side surface, a third longitudinal bump located on the second square side surface, and a fourth longitudinal bump located on the second square side surface.

In addition to one or more of the features described above, or as an alternative, further embodiments may include that the third longitudinal bump is located opposite the first longitudinal bump and the fourth longitudinal bump is located opposite the second longitudinal bump. The second thickness of the drive key is measured between the third longitudinal bump and the first longitudinal bump. The second thickness of the drive key is measured between the fourth longitudinal bump and the second longitudinal bump.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 1 schematically shows a twin bed system with a rotary valve;

FIG. 5 shows the schematic of the rotary valve in one application;

FIG. 6A illustrates a cross-sectional view of the rotary valve, in accordance with an embodiment of the present disclosure;

FIG. 7 illustrates an exploded view of the rotary valve, in accordance with an embodiment of the present disclosure;

DETAILED DESCRIPTION

A detailed description of one or more embodiments of the disclosed apparatus and method are presented herein by way of exemplification and not limitation with reference to the Figures.

Figure 1:
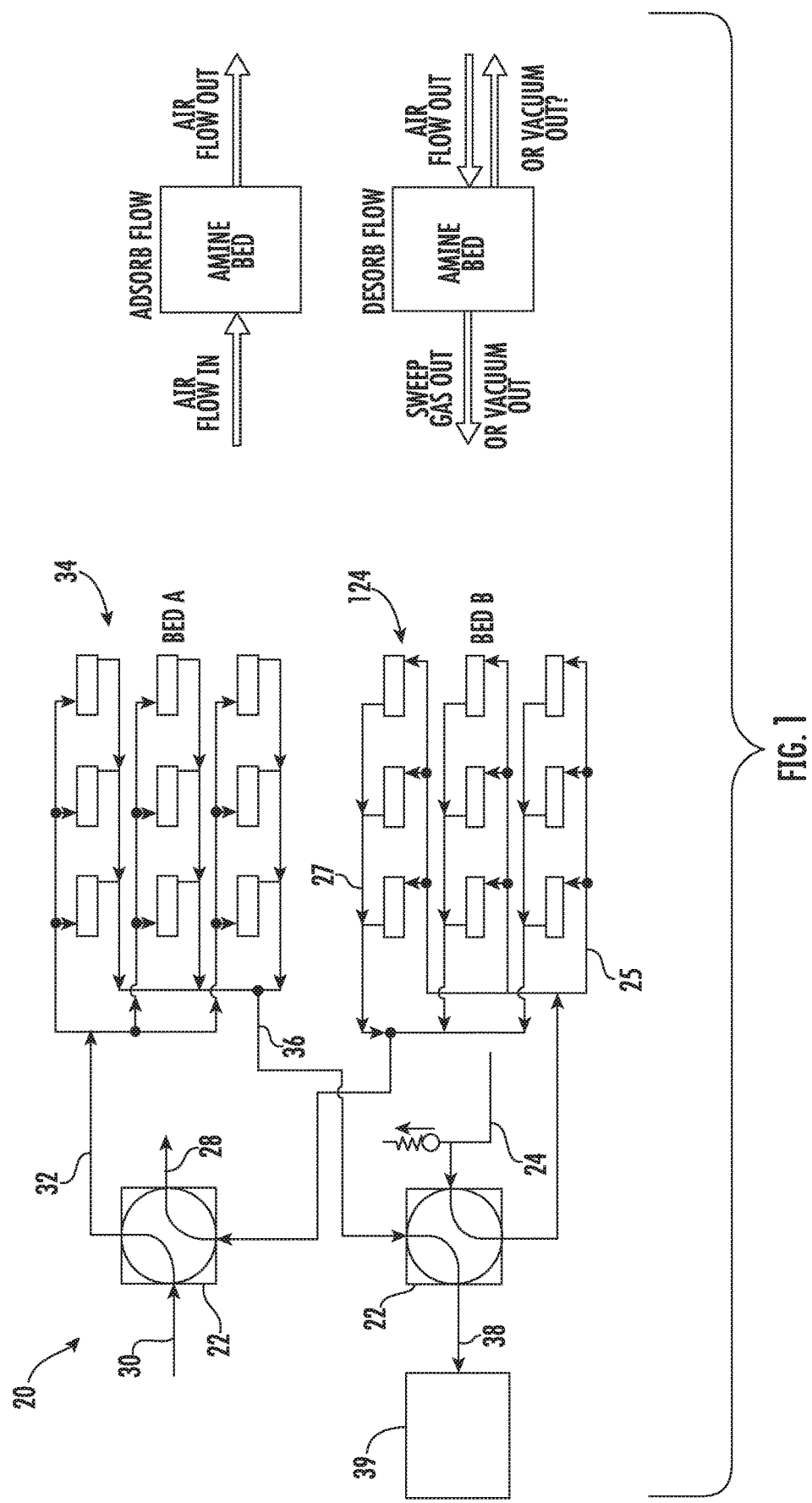

Referring now to FIG. 1, a system 20 for providing a clean air flow is illustrated. A rotary valve 22 is shown schematically in FIG. 1, and controls the flow of gases to a second sorbent bed 124 (i.e., sorbent bed B) and a first sorbent bed 34 (i.e., sorbent bed A). As mentioned, the second sorbent bed 124 and the first sorbent bed 34 may contain sorbent beads. It is understood that the rotary valve 22 and component thereof may be applicable to any system 20 and are not limited to the system as illustrated.

A source 30 of air to be cleaned passes through the rotary valve 22 and to a connection 32 leading to the first sorbent bed 34 in the FIG. 1 position. The first sorbent bed 34 remove impurities from the air, and pass a clean air stream to a connection 36 leading back through the rotary valve 22 and to an air flow return 38, which would lead to an environment to utilize the air 39. As mentioned above, the environment may be a spaceship, a space suit, etc. While the application mentioned above are typical, the twin bed process has been utilized for various chemical treatments, and the rotary valve 22 discussed herein would have application in such systems. Generally, the rotary valve 22 discussed herein would be beneficial in any twin bed chemical process wherein the beds are alternatively put in a "cleaning" and "being cleaned" modes as will be explained below.

At the same time the air to be cleaned is passing through the first sorbent bed 34, a sweep gas is provided from a source 24 through the rotary valve 22, to a connection 25 leading to the second sorbent bed 124. This sweep gas will remove impurities which have been previously deposited in second sorbent bed 124, and drive the impurities along with the sweep gas to a connection 27 leading back through the rotary valve 22 to a sweep gas vent or a vacuum via connection 28. This gas is typically either treated by chemical processes, or merely vented from the environment.

As is well known, the beds 34 and 124 continue to switch between the "cleaning" and "being cleaned" modes.

Figure 2A:
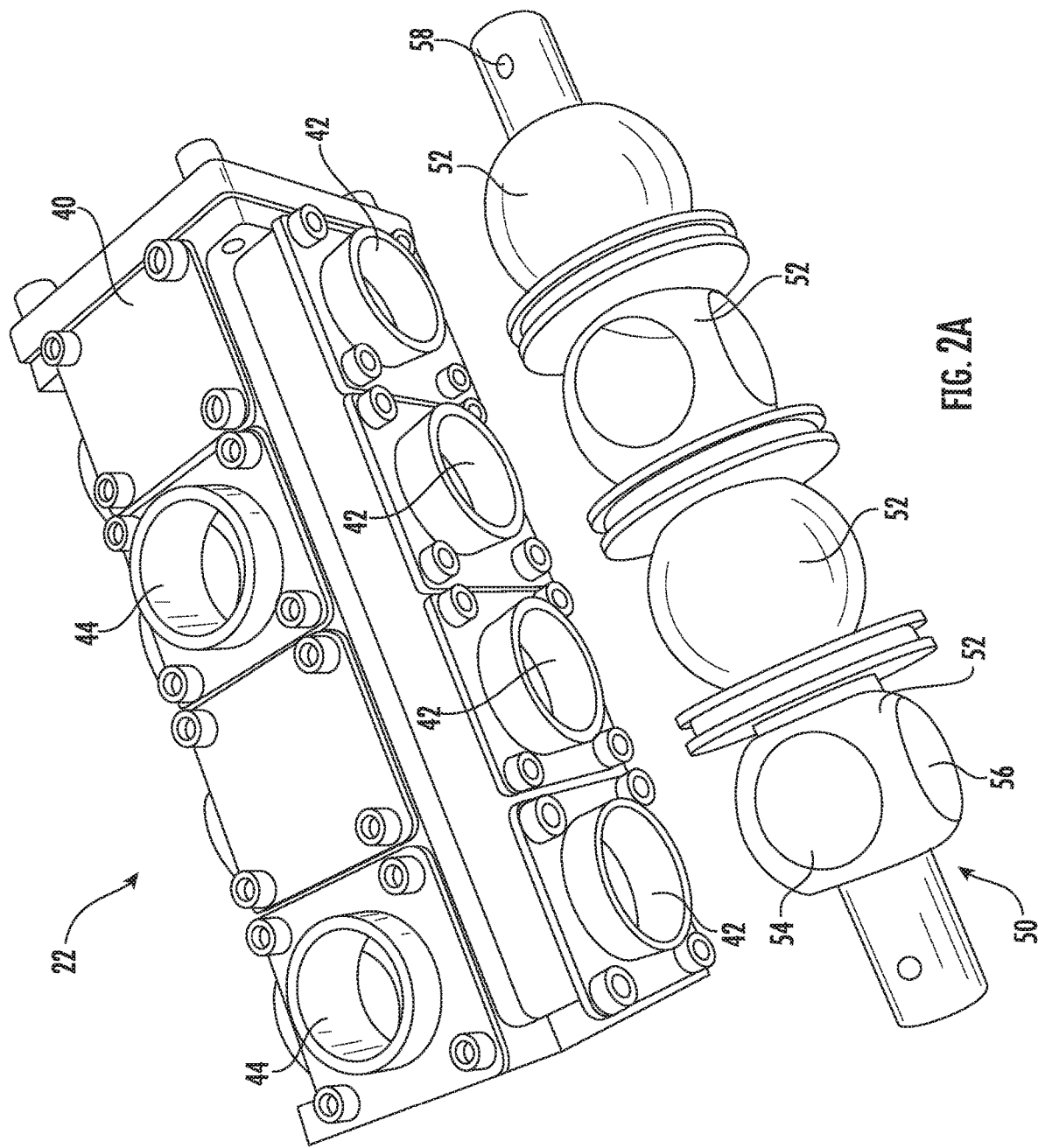
FIG. 2A shows components of the rotary valve.

Referring now to FIG. 2A, details of the rotary valve 22 are illustrated. As shown, a valve housing 40 includes four side connections 42 (i.e., ports), and two top connections or ports 44. The ports 44 are placed on a bottom side of FIG. 2A, and four other side connections 42 face into the plane of FIG. 2A and cannot be seen.

As shown, a rotary valve 50 includes four ball valves 52 having a fluid L-shaped connection between port 54 and port 56. A driveshaft 58 drives the rotary valve 50, as will be explained below.

The rotary valve 50 is located in the valve housing 40 but is illustrated outside of the valve housing 40 in FIG. 2A for explanatory purposes.

Embodiments disclosed herein relate to the interconnection of four ball valve 52 utilizing drive keys 400 (See FIGS. 6-10) and how a uniquely designed drive key with a non-uniform thickness can reduce hysteresis, which is a lag in movement between the actuator motor 62 (See FIG. 2c) and each of the four ball valves 52 and each of the drive keys 400 (See FIGS. 6-10) connecting each of the four ball valves 52.

Figure 2B:
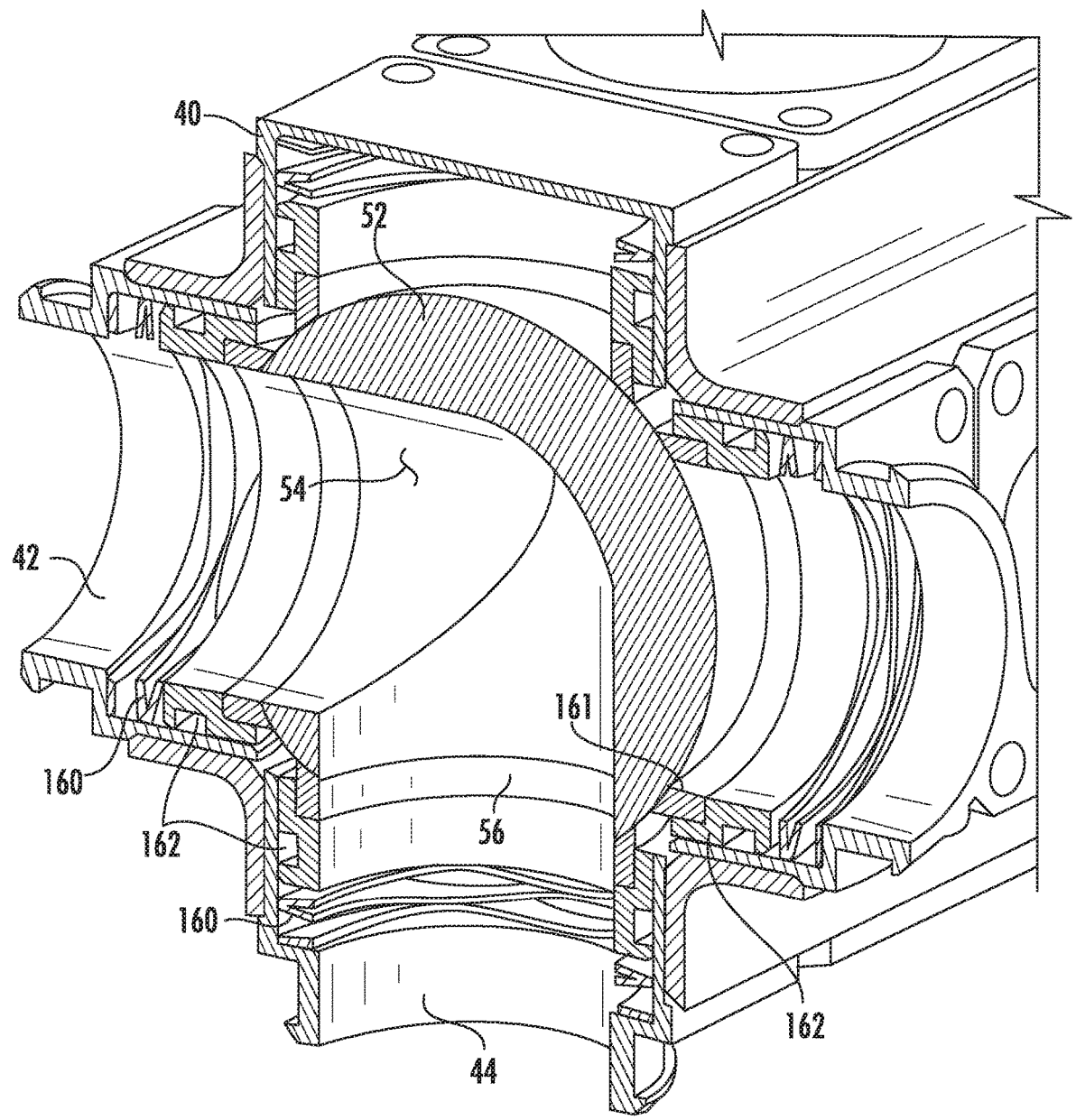
FIG. 2B shows a detail of one ball on the rotary valve.

Referring now to FIG. 2B, which shows portions of the rotary valve 50 within the valve housing 40, the ball valve 52 is rotatable within the valve housing 40. A spring element 160 biases a valve seat 162 upwardly against the port 54 and port 56 to provide a fluid tight seal. As can also be appreciated from FIG. 2B, other valve seats 162 are being biased against the outer periphery 161 of the ball valve 52 to provide a fluid tight seal.

Figure 2C:
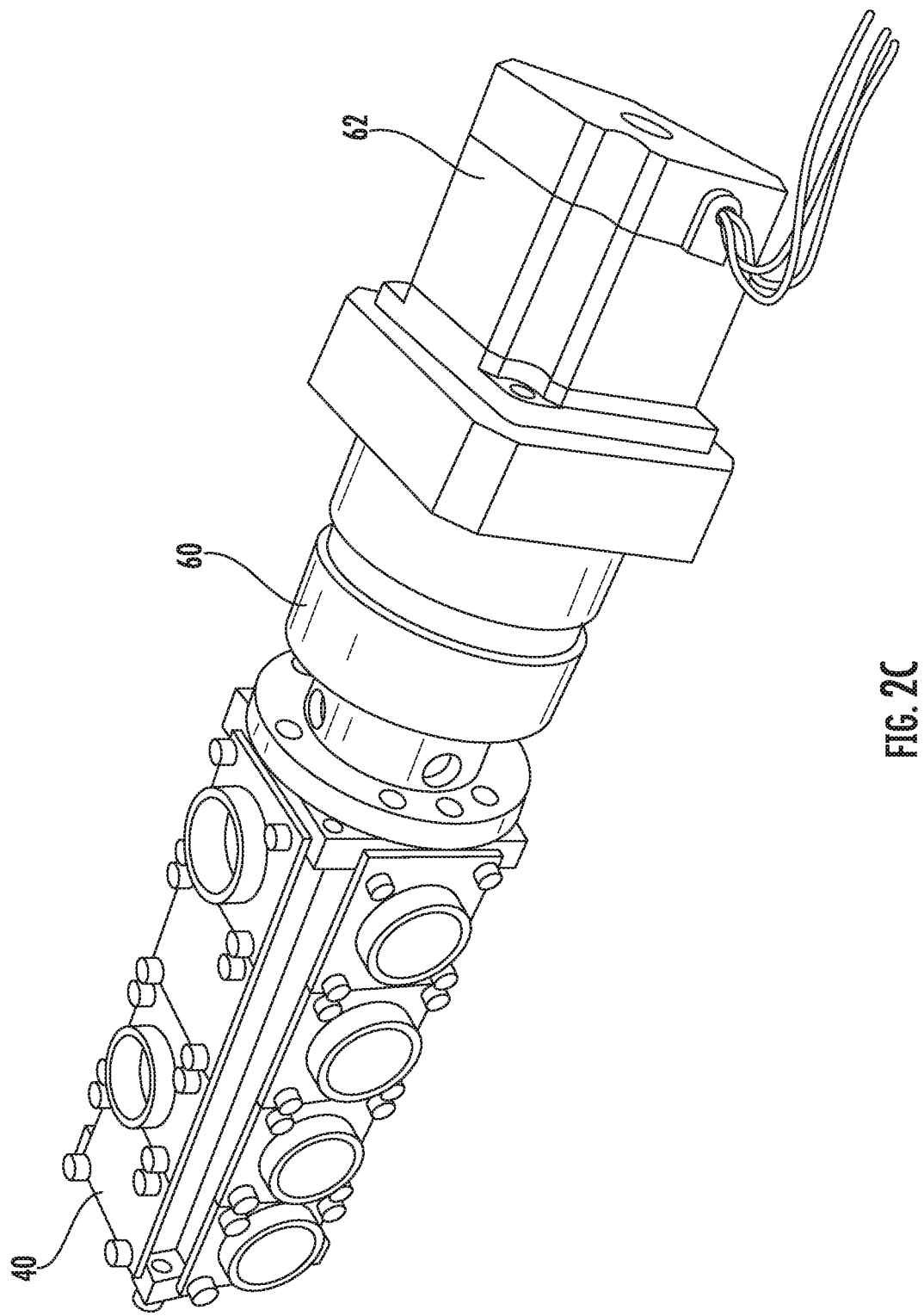
FIG. 2C shows a drive arrangement for the rotary valve.

Referring now to FIG. 2C, a gear box 60 connected to an actuator motor 62 is illustrated. An actuator motor 62 drives the driveshaft 58 (see FIG. 2A) through the gear box 60 to change the location of the ball valves 52.

Figure 3:
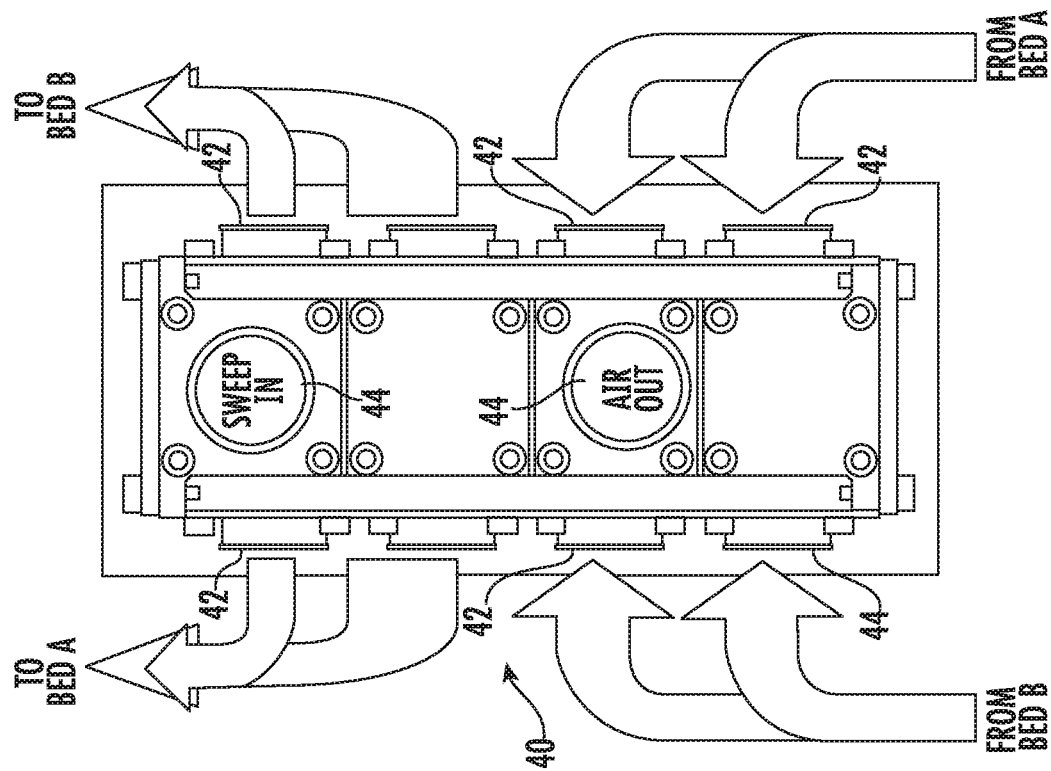
FIG. 3 shows a top view of a rotary valve.

Referring now to FIG. 3, the ports 42 on the side include alternate connections to and from each of the first sorbent bed 34 and the second sorbent bed 124. One of the top ports 44 may be sweep air in, while the other may be clean air out.

Figure 4:
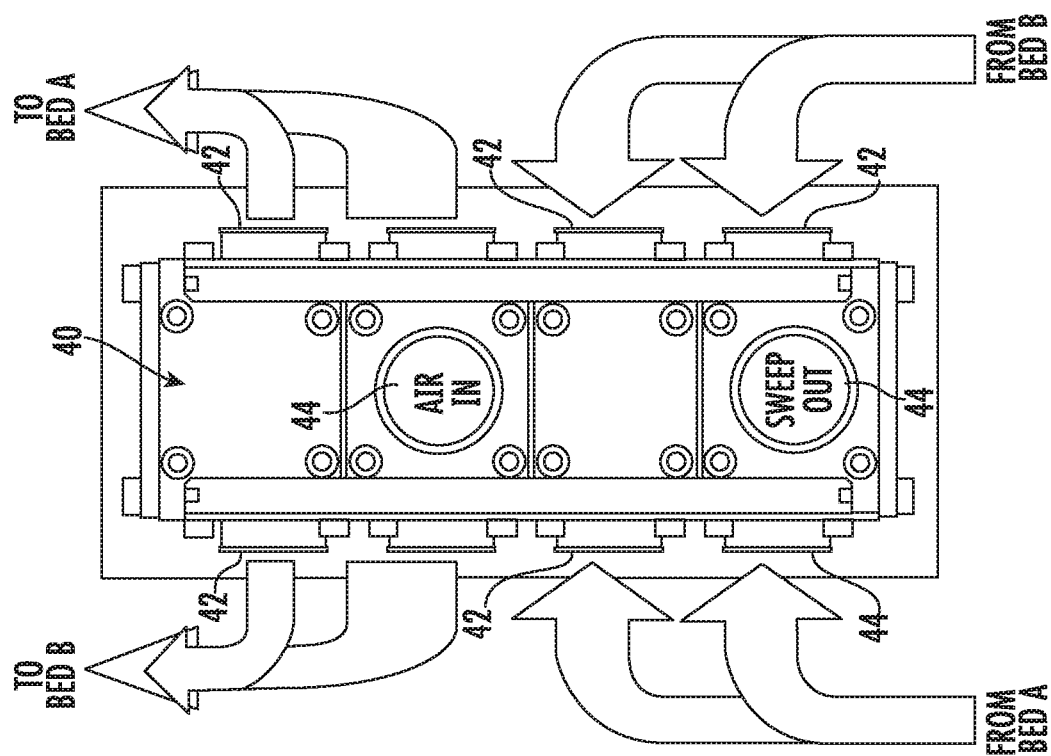
FIG. 4 shows a bottom view of the rotary valve.

Referring now to FIG. 4, the opposed view is illustrated, and includes the air to be cleaned in passing in one port 44 while the sweep gas out connection is in another port 44.

Referring now to FIG. 5, a schematic of the first sorbent bed 34 and the second sorbent bed 124 connected to the process air to be cleaned from the source 30, the "cleaned" process air to be utilized by the air flow return 38, the sweep (or cleaning) gas from source 24, and the sweep gas out connection 28 is illustrated.

Figure 6B:
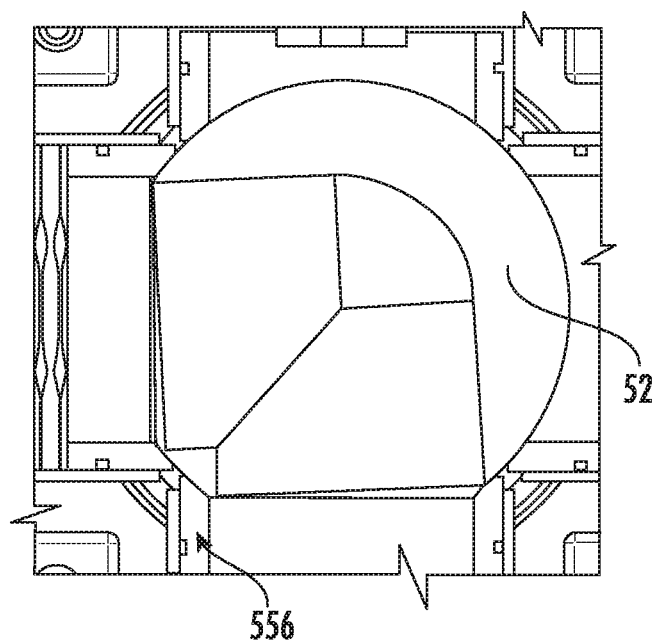
FIG. 6B illustrates a cross-sectional view of the rotary valve with improper seal compression.

Referring now to FIGS. 6A, 6B, and 7, a cross-sectional view of the rotary valve 50 is illustrated in FIG. 6A to show the connection between two ball valves 52a, 52b and an exploded view of the rotary valve 50 is illustrated in FIG. 7. The two ball valves 52a, 52b include a first ball valve 52a and a second ball valve 52b. The first ball valve 52a includes a stem 252a extending outward from the ball valve 52a and towards the second ball valve 52b. The second ball valve 52b includes a stem 252b extending outward from second ball valve 52b and towards the first ball valve 52a.

The stems 252a, 252b extend towards each other through an opening 300 of a stem housing 350. Each of the stems 252a, 252b are supported within the opening by a first seal 310 and a second seal 320. The first seal 310 being located at a distal stem end 356 of the first stem 252a, 252b and the second seal 320 being located at a proximal stem end 358 of the first stem 252a, 252b.

The first proximal stem end 358a is located where the first stem 252a, meets the first ball valve 52a and the first distal stem end 356a is located opposite the first proximal stem end 358a. The second proximal stem end 358b is located where the second stem 252b, meets the second ball valve 52b and the second distal stem end 356b is located opposite the second proximal stem end 358b.

The first stem 252a includes a first slotted opening 260a extending from the first distal stem end 356a into the first stem 252a. The second stem 252b includes a second slotted opening 260b extending from the second distal stem end 356b into the second stem 252b.

A drive key 400 is located within the first slotted opening 260a of the first ball valve 52a and the second slotted opening 260b of the second ball valve 52b. The drive key 400 extends from the first slotted opening 260a of the first ball valve 52a to the second slotted opening 260b of the second ball valve 52b to operably connect the first ball valve 52a to the second ball valve 52b. Thus, when either of the first ball valve 52a or the second ball valve 52b rotates both ball valves 52a, 52b will rotate in near unison.

Previous designs have utilized a drive key that is primarily flat on all surfaces, square in shape, and having a uniform thickness about equivalent to a height H1 of the slotted openings 260a, 260b. The uniform thickness being about equivalent to the height H1 of the slotted opening 260a, 260b may cause rotational hysteresis and irregular compression of the seals 310, 320 if the position of the slotted openings 260a, 260b are slightly off due to tolerances or tolerance stack ups. The uniform thickness being about equivalent to the height H1 of the slotted opening may also lead to difficulty rotating one ball valve 52 with the other ball valve 52 if the position of the slotted openings 260 are slightly off due to tolerances or tolerance stack ups. To avoid this situation and accommodate tolerances, the thickness of the drive key 400 must be reduced, increasing the clearance between the drive key 400 and the slotted opening, however this leads to an increase in hysteresis. An increase in hysteresis, or in other words delayed or non-uniform rotation amongst multiple ball valves 52 that otherwise should be in unison or near unison, can lead to improper registration of the seals at 556 (See FIG. 6B) with respect to the flow path in the ball valve 52 resulting in leakage.

The drive key 400 illustrated in FIG. 6A, according to one or more embodiments, has a non-uniform thickness, which corrects this aforementioned irregular compression and hysteresis. The non-uniform thickness allows the drive key 400 to be angled slightly between the first slotted opening 260a of the first ball valve 52a and the second slotted opening 260b of the second ball valve 52b. The drive key 400 is thinner in thickness proximate the middle 412 of the drive key 400 and thickens out towards a first outer end 414a and a second outer end 414b of the drive key 400.

Figure 8:
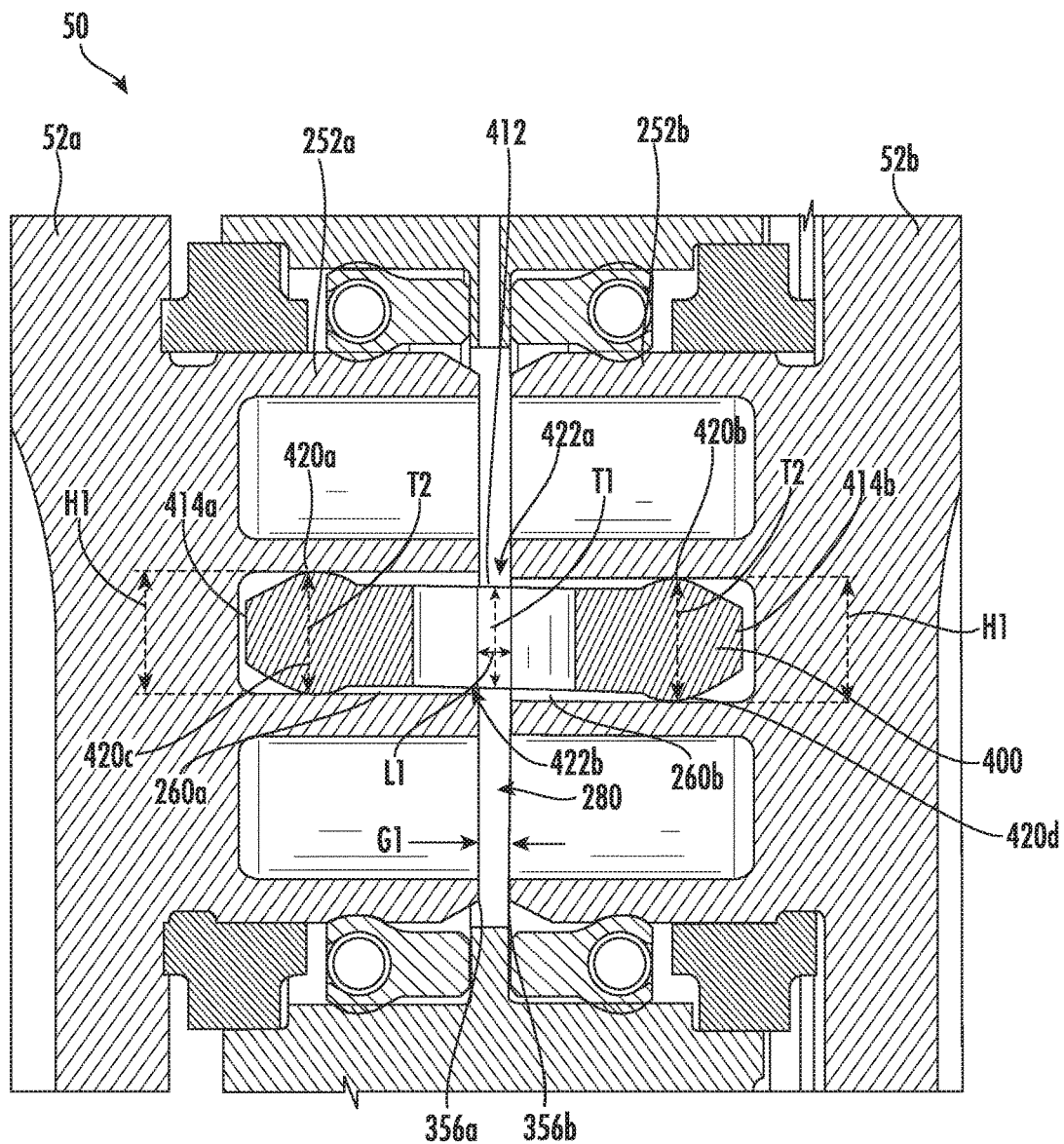
FIG. 8 illustrates an enlarged cross-sectional view of the rotary valve, in accordance with an embodiment of the present disclosure.
Figure 9:
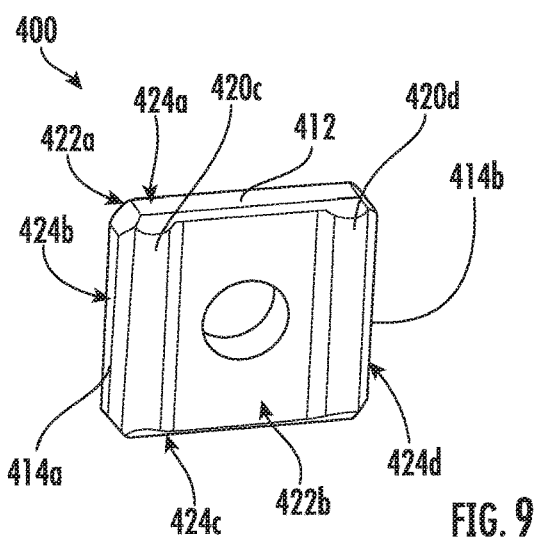
FIG. 9 illustrates an isometric view of a drive key for the rotary valve, in accordance with an embodiment of the present disclosure.

Referring now to FIGS. 8 and 9, an enlarged cross-sectional view of the rotary valve 50 is illustrated in FIG. 8 to show the connection between two ball valves 52 and an isometric view of the drive key 400 is illustrated in FIG. 9. FIG. 8 illustrates the first ball valve 52a and the second ball valve 52b. FIG. 8 illustrates a first slotted opening 260a in the first stem 252a of the first ball valve 52a that is slightly offset with a second slotted opening 260b in the second stem 252b of the second ball valve 52b. Ideally the first slotted opening 260a in the first stem 252a of the first ball valve 52a would align with the second slotted opening 260b in the second stem 252b of the second ball valve 52b. Some tolerances or tolerance stack ups may cause the first slotted opening 260a in the first stem 252a of the first ball valve 52a to be slightly offset with the second slotted opening 260b in the second stem 252b of the second ball valve 52b.

The drive key 400 being thinner in thickness proximate the middle 412 of the drive key 400 and thickening out towards the first outer end 414a and the second outer end 414b of the drive key 400 allows the slotted opening 260a in the first stem 252a of the first ball valve 52a to be slightly offset with the second slotted opening 260b in the second stem 252b of the second ball valve 52b without adversely affecting the function of the rotary valve 50.

The drive key 400 has a first thickness T1 proximate the middle 412 of the drive key 400 and thickens out to a second thickness T2 proximate the first outer end 414a and the second outer end 414b of the drive key 400. The second thickness T2 is greater in magnitude than the first thickness T1. The second thickness is less than or about equal to the height H1 of the slotted openings 260.

The drive key 400 may have a first thickness T1 that spans across a first length L1 of the drive key 400. The first length L1 may be greater than or equal to a gap distance G1 of a gap 280 between a distal stem end 356 of the first stem 252a of the first ball valve 52a and a distal stem end 356 of the second stem 252b of the second ball valve 52b.

As illustrated in FIG. 9, the drive key 400 may be shaped similar to a square prism with two square side surfaces 422a, 422b and four rectangular side surfaces 424a, 424b, 424c, 424d. The two square side surfaces 422a, 422b includes a first square side surface 422a and a second square side surface 422b opposite the first square side surface. The first square side surfaces 422a and the second square side surface 422b are square in shape. The four rectangular side surface 424a, 424b, 424c, 424d includes a first rectangular side surface 424a, a second rectangular side surface 424b, a third rectangular side surface 424c, and a fourth rectangular side surface 424d. The first rectangular side surface 424a extends from the first square side surface 422a to the second square side surface 422b. The second rectangular side surface 424b extends from the first square side surface 422a to the second square side surface 422b. The third rectangular side surface 424c extends from the first square side surface 422a to the second square side surface 422b. The fourth rectangular side surface 424d extends from the first square side surface 422a to the second square side surface 422b.

The third rectangular side surface 424c is located opposite the first rectangular side surface 424a and the fourth rectangular side surface 424d is located opposite the second rectangular side surface 424b. The first rectangular side surface 424a, the second rectangular side surface 424b, the third rectangular side surface 424c, and the fourth rectangular side surface 424d are rectangular in shape. The second rectangular side surface 424b is located at the first outer end 414a of the drive key 400. The fourth rectangular side surface 424d is located at the second outer end 414b of the drive key 400.

The first square side surface 422a and the second square side surface 422b include longitudinal bumps 420a, 420b, 420c, 420d. The longitudinal bumps 420 420a, 420b, 420c, 420d may extend from the first rectangular side surface 424a to the third rectangular side surface 424c. The longitudinal bumps 420a, 420b, 420c, 420d. create the second thickness T2 within the drive key 400. In other words, the drive key 400 has the second thickness T2 at the longitudinal bumps 420a, 420b, 420c, 420d.

The longitudinal bumps includes a first longitudinal bump 420a located on the first square side surface 422a, a second longitudinal bump 420b located on the first square side surface 422a, a third longitudinal bump 420c located on the second square side surface 422b, and a fourth longitudinal bump 420d located on the second square side surface 422b.

The third longitudinal bump 420c is located opposite the first longitudinal bump 420a and the fourth longitudinal bump 420d is located opposite the second longitudinal bump 420b. The second thickness T2 of the drive key is measured between the third longitudinal bump 420c and the first longitudinal bump 420a. The second thickness T2 of the drive key is measured between the fourth longitudinal bump 420d and the second longitudinal bump 420b. For the least amount of hysteresis and maximum amount of mismatch accommodation between slots, the ideal shape of the first longitudinal bump 420a and the third longitudinal bump 420c together would comprise a cylinder equal in diameter to thickness T2. In other words, the radius for first longitudinal bump 420a and the radius for the third longitudinal bump 420c would be equal and the centerlines of these radii would be the same. However, depending on several variables, it is not required that this be true and the shape of the longitudinal bumps 420a-420d can deviate from the above ideal condition. Additionally, the longitudinal bumps 420a-420d do not have to be continuous between the first rectangular side surface 424a and the third rectangular side surface 424c. In an embodiment, the longitudinal bumps 420a-420d may extend continuously or intermittently between the first rectangular side surface 424a and the third rectangular side surface 424c.

Figure 10:
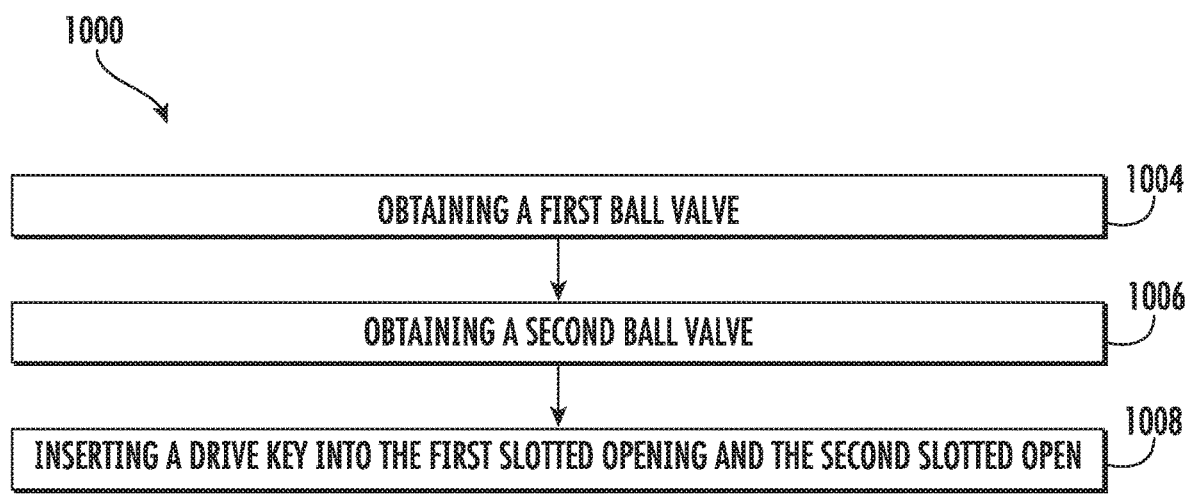
FIG. 10 illustrates a flow chart of a method of assembling the rotary valve, in accordance with an embodiment of the present disclosure.

Referring now to FIG. 10, a flow chart of method 1000 of assembling a rotary valve 50 is illustrated, in accordance with an embodiment of the disclosure.

At block 1004, a first ball valve 52a is obtained. The first ball valve 52a comprising a first stem 252a extending from a first proximal stem end 358a to a first distal stem end 356a outward from the first ball valve 52a. The first stem 252a comprising a first slotted opening 260a extending from the first distal stem end 356a into the first stem 252a.

At block 1006, a second ball valve 52b is obtained. The second ball valve 52b comprising a second stem 252b extending from a second proximal stem end 358b to a second distal stem end 356b outward from the second ball valve 52b. The second stem 252b comprising a second slotted opening 260b extending from the second distal stem end 356b into the second stem 252b. The second stem 252b extends towards the first stem 252a.

At block 1008, a drive key 400 inserted into the first slotted opening 260a and the second slotted opening 260b. The drive key 400 extending from the first slotted opening 260a of the first ball valve 52a to the second slotted opening 260b of the second ball valve 52b to operably connect the first ball valve 52a to the second ball valve 52b. The drive key 400 has a non-uniform thickness.

While the above description has described the flow process of FIG. 10 in a particular order, it should be appreciated that unless otherwise specifically required in the attached claims that the ordering of the steps may be varied.

Technical effects and benefits of the features described herein include utilizing a drive key with a non-uniform thickness in a rotary valve to reduce hysteresis, prevent jamming, and irregular compression of seals.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary valve, comprising:
    a first ball valve comprising a first stem extending from a first proximal stem end to a first distal stem end outward from the first ball valve, the first stem comprising a first slotted opening extending from the first distal stem end into the first stem;
    a second ball valve comprising a second stem extending from a second proximal stem end to a second distal stem end outward from the second ball valve, the second stem comprising a second slotted opening extending from the second distal stem end into the second stem, wherein the second stem extends towards the first stem; and
    a drive key located within the first slotted opening and the second slotted opening, the drive key extending from the first slotted opening of the first ball valve to the second slotted opening of the second ball valve to operably connect the first ball valve to the second ball valve,
    wherein the drive key comprises a square prism,
    wherein the drive key has a non-uniform thickness, and
    wherein a first thickness proximate a middle of the drive key is less than a second thickness proximate a first outer end of the drive key and a second outer end of the drive key.

2. The rotary valve of claim 1, wherein the drive key comprises a first square side surface and a second square side surface opposite the first square side surface.

3. The rotary valve of claim 2, wherein the drive key comprises:
    a first rectangular side surface extending from the first square side surface to the second square side surface;
    a second rectangular side surface extending from the first square side surface to the second square side surface, the second rectangular side surface being located at the first outer end of the drive key;
    a third rectangular side surface located opposite the first rectangular side surface, the third rectangular side surface extending from the first square side surface to the second square side surface; and
    a fourth rectangular side surface located opposite the second rectangular side surface, the fourth rectangular side surface extending from the first square side surface to the second square side surface, wherein the fourth rectangular side surface is located at the second outer end of the drive key.

4. The rotary valve of claim 3, wherein the drive key comprises:
    a first longitudinal bump located on the first square side surface;
    a second longitudinal bump located on the first square side surface;
    a third longitudinal bump located on the second square side surface; and
    a fourth longitudinal bump located on the second square side surface.

5. The rotary valve of claim 4, wherein the third longitudinal bump is located opposite the first longitudinal bump and the fourth longitudinal bump is located opposite the second longitudinal bump, wherein the second thickness of the drive key is measured between the third longitudinal bump and the first longitudinal bump, and wherein the second thickness of the drive key is measured between the fourth longitudinal bump and the second longitudinal bump.

6. The rotary valve of claim 4, wherein the first longitudinal bump, the second longitudinal bump, the third longitudinal bump, and the fourth longitudinal bump extend continuously or intermittently between the first rectangular side surface and the third rectangular side surface.

7. The rotary valve of claim 1, wherein the first distal end and the second distal end are separated by a gap having a gap distance, and wherein the first thickness spans across a first length of the drive key, the first length being greater than or equal to the gap distance.

8. A drive key for use in a rotary valve, the drive key comprising:
- a first square side surface;
- a second square side surface opposite the first square side surface;
- a first rectangular side surface extending from the first square side surface to the second square side surface;
- a second rectangular side surface extending from the first square side surface to the second square side surface;
- a third rectangular side surface located opposite the first rectangular side surface, the third rectangular side surface extending from the first square side surface to the second square side surface; and
- a fourth rectangular side surface located opposite the second rectangular side surface, the fourth rectangular side surface extending from the first square side surface to the second square side surface, wherein the drive key comprises a square prism, and
wherein the drive key has a non-uniform thickness, and
wherein a first thickness proximate a middle of the drive key is less than a second thickness proximate a first outer end of the drive key and a second outer end of the drive key.

9. The drive key of claim 8,
wherein the second rectangular side surface is located at the first outer end of the drive key and the fourth rectangular side surface is located at the second outer end of the drive key.

10. The drive key of claim 9, wherein the drive key comprises:
- a first longitudinal bump located on the first square side surface;
- a second longitudinal bump located on the first square side surface;
- a third longitudinal bump located on the second square side surface; and
- a fourth longitudinal bump located on the second square side surface.

11. The drive key of claim 10, wherein the third longitudinal bump is located opposite the first longitudinal bump and the fourth longitudinal bump is located opposite the second longitudinal bump, wherein the second thickness of the drive key is measured between the third longitudinal bump and the first longitudinal bump, and wherein the second thickness of the drive key is measured between the fourth longitudinal bump and the second longitudinal bump.

12. A method of assembling a rotary valve, the comprising:
- obtaining a first ball valve comprising a first stem extending from a first proximal stem end to a first distal stem end outward from the first ball valve, the first stem comprising a first slotted opening extending from the first distal stem end into the first stem;
- obtaining a second ball valve comprising a second stem extending from a second proximal stem end to a second distal stem end outward from the second ball valve, the second stem comprising a second slotted opening extending from the second distal stem end into the second stem, wherein the second stem extends towards the first stem; and
- inserting a drive key into the first slotted opening and the second slotted opening, the drive key extending from the first slotted opening of the first ball valve to the second slotted opening of the second ball valve to operably connect the first ball valve to the second ball valve, wherein the drive key comprises a square prism,
wherein the drive key has a non-uniform thickness, and
wherein a first thickness proximate a middle of the drive key is less than a second thickness proximate a first outer end of the drive key and a second outer end of the drive key.

13. The method of claim 12, wherein the drive key comprises a first square side surface and a second square side surface opposite the first square side surface.

14. The method of claim 13, wherein the drive key comprises:
- a first rectangular side surface extending from the first square side surface to the second square side surface;
- a second rectangular side surface extending from the first square side surface to the second square side surface, the second rectangular side surface being located at the first outer end of the drive key;
- a third rectangular side surface located opposite the first rectangular side surface, the third rectangular side surface extending from the first square side surface to the second square side surface; and
- a fourth rectangular side surface located opposite the second rectangular side surface, the fourth rectangular side surface extending from the first square side surface to the second square side surface, wherein the fourth rectangular side surface is located at the second outer end of the drive key.

15. The method of claim 14, wherein the drive key comprises:
- a first longitudinal bump located on the first square side surface;
- a second longitudinal bump located on the first square side surface;
- a third longitudinal bump located on the second square side surface; and
- a fourth longitudinal bump located on the second square side surface.

16. The method of claim 15, wherein the third longitudinal bump is located opposite the first longitudinal bump and the fourth longitudinal bump is located opposite the second longitudinal bump, wherein the second thickness of the drive key is measured between the third longitudinal bump and the first longitudinal bump, and wherein the second thickness of the drive key is measured between the fourth longitudinal bump and the second longitudinal bump.

\* \* \* \* \*